United States Patent
Whitley

(10) Patent No.: US 12,503,324 B2
(45) Date of Patent: Dec. 23, 2025

(54) VEHICLE RESTRAINT

(71) Applicant: ASSA ABLOY Entrance Systems AB, Landskrona (SE)

(72) Inventor: L. Blake Whitley, Arlington, TX (US)

(73) Assignee: ASSA ABLOY Entrance Systems AB, Landskrona (SE)

(*) Notice: Subject to any disclaimer, the term of this patent is extended or adjusted under 35 U.S.C. 154(b) by 210 days.

(21) Appl. No.: 18/102,418

(22) Filed: Jan. 27, 2023

(65) Prior Publication Data
US 2024/0253917 A1 Aug. 1, 2024

(51) Int. Cl.
*B65G 69/00* (2006.01)

(52) U.S. Cl.
CPC .................. *B65G 69/003* (2013.01)

(58) Field of Classification Search
CPC .................................. B65G 69/003
See application file for complete search history.

(56) References Cited

U.S. PATENT DOCUMENTS

| | | |
|---|---|---|
| 4,208,161 A | 6/1980 | Hahn et al. |
| 4,264,259 A | 4/1981 | Hipp |
| 4,282,621 A | 8/1981 | Anthony et al. |
| 4,443,150 A | 4/1984 | Hahn et al. |
| 4,472,099 A | 9/1984 | Hahn et al. |
| 4,605,353 A | 8/1986 | Hahn et al. |
| 4,634,334 A | 1/1987 | Hahn et al. |
| 4,695,216 A | 9/1987 | Erlandsson |
| 4,784,567 A | 11/1988 | Hageman et al. |
| 4,815,918 A * | 3/1989 | Bennett ............... B65G 69/003 414/584 |
| 5,026,242 A * | 6/1991 | Alexander .......... B65G 69/003 414/584 |
| 5,882,167 A * | 3/1999 | Hahn .................. B65G 69/003 414/584 |
| 6,162,005 A | 12/2000 | Fritz |

(Continued)

FOREIGN PATENT DOCUMENTS

WO   WO2019/232055   * 12/2019 ........... B65G 69/003

OTHER PUBLICATIONS

International Search Report and Written Opinion from corresponding International Application No. PCT/EP2024/051554, mailed May 6, 2024, all pages cited in its entirety.

*Primary Examiner* — Mark C Hageman
(74) *Attorney, Agent, or Firm* — Burr & Forman

(57) ABSTRACT

A restraining assembly for a vehicle restraint for restraining a rear impact guard (RIG) bar of a vehicle or trailer at a dock may include a hook. The hook may further include a locking arm at a first end thereof, a catch portion at a second end thereof, an axial orifice about which the hook rotates responsive to movement of the RIG bar in contact with the catch portion or the locking arm, and a cam surface disposed between the locking arm and the axial orifice. The hook may be rotatably mounted to a vertical slide assembly of the vehicle restraint that slidably engages the RIG bar to adjust to a height of the RIG bar against a bias applied to the vertical slide assembly. The restraining assembly may be rotated only responsive to movement of the RIG bar to transition between a receiving position for receiving or releasing the RIG bar and a locking position for retaining the RIG bar.

22 Claims, 17 Drawing Sheets

(56) References Cited

U.S. PATENT DOCUMENTS

| | | | | |
|---|---|---|---|---|
| 6,431,819 B1 * | 8/2002 | Hahn | ................... | B65G 69/003 |
| | | | | 414/401 |
| 9,174,811 B2 * | 11/2015 | Proffitt | ................. | B65G 69/003 |
| 9,227,799 B2 * | 1/2016 | Brooks | ................. | B65G 69/003 |
| 9,272,854 B2 * | 3/2016 | Lessard | ................. | B65G 69/28 |
| 10,086,861 B1 * | 10/2018 | Martin | ................. | B62B 5/0495 |
| 10,329,104 B2 | 6/2019 | Kosek et al. | | |
| 10,689,213 B2 * | 6/2020 | Mushynski | .......... | B65G 69/003 |
| 2007/0248440 A1 | 10/2007 | Andersen et al. | | |
| 2020/0262663 A1 | 8/2020 | Whitley | | |
| 2022/0055848 A1 | 2/2022 | Whitley et al. | | |

* cited by examiner

VEHICLE RESTRAINT

TECHNICAL FIELD

Example embodiments generally relate to vehicle restraints and, in particular, relate to vehicle restraints for restraining transport trucks, trailers, and/or other vehicles at loading docks.

BACKGROUND

Vehicle restraints are well known in the material handling industry and are typically used to prevent a trailer or other transport vehicle from moving away from a loading dock during the loading and/or unloading process. Absent a restraint, the vehicle may tend to move away from the loading dock for a number of reasons, such as the slope of the driveway, the kinetic energy imparted to the vehicle by a fork truck or personnel during the loading or unloading process, etc. If the vehicle is allowed to move away from the dock face, a gap may form between the vehicle and the dock face or between the vehicle and the lip of an associated dock leveler. If this occurs, a fork truck operator could inadvertently drive into the gap, or other personnel could inadvertently step into the gap, potentially damaging equipment or injuring personnel.

Unlike wheel chocks, conventional vehicle restraints typically engage the Rear Impact Guard ("RIG") bar of the vehicle. As is well known, RIG bars (which can also be referred to as "ICC" bars) are horizontal members that extend across the rear of the vehicle below the bed. In the U.S., regulations require that the vertical distance between the bottom edge of the RIG bar and the ground not exceed 22 inches at any point across the full width of the member, and that the rearmost surface of the RIG bar be within 12 inches of the rear extremity of the vehicle.

There are several different types of vehicle restraints. One type employs a restraining member (e.g., a hook) operably coupled to a vertically-moving carriage having rollers that ride on a track mounted to the face of the loading dock. Examples of such restraints are disclosed in U.S. Pat. Nos. 4,472,099, 4,443,150, 4,282,621, 4,264,259, 4,695,216 and 6, 162,005, each of which is incorporated herein by reference in its entirety. To engage with the restraint, the vehicle backs into the loading dock until the RIG bar contacts an angled lead-in surface of the restraint carriage, causing the carriage to move downwardly on the track as the RIG bar continues moving back. Eventually the RIG bar moves onto a horizontal surface of the restraint carriage that extends aft from the angled surface, enabling the locking hook to rotate upwardly to engage the RIG bar and secure the vehicle adjacent the loading dock.

A second category of restraint system includes a vertical bar or similar restraining member that is moved into position in front of the RIG bar to prevent forward movement of the vehicle away from the loading dock. Various types of mechanisms have been proposed to position the bar in such systems, such as those disclosed in, for example, U.S. Pat. Nos. 4,634,334, 4,605,353, and 4,784,567, each of which is incorporated herein by reference in its entirety. In particular, some of these restraint systems pivot the bar into the vertical position to restrain the vehicle. One shortcoming of this type of system, however, is that the raised height of the bar is constant and, as a result, it may interfere with hitches and/or other equipment mounted to the underside of the vehicle.

A third category of restraint system utilizes one or more hooks which pivot about a fixed hinge mounted to the dock wall. See, for example, U.S. Pat. Nos. 4,605,353, 4,208,161 and 4,605,353, each of which is incorporated herein by reference in its entirety. In this type of system, the distance from the dock wall to the hook varies as the hook moves through its arc of travel to engage the RIG bar, and as the vehicle moves up and down during the loading/unloading process. If the final distance between the hook and the dock face after the loading/unloading process is less than the distance when the process started, the RIG bar may impart such a high load on the hook that the hook may not release when desired.

All of the restraint systems described above operate by restricting horizontal movement of the transport vehicle away from the loading dock. This movement may be caused by a variety of factors, such as the driver inadvertently attempting to drive away from the loading dock while the restraint is engaged, the slope of the ground, and/or the kinetic energy imparted to the vehicle by the loading and unloading of goods and materials. Of these, the most common causes of vehicle horizontal movement are the accelerations/decelerations imparted to the vehicle by loading and unloading of goods and materials by hand, fork lift, etc.

Regardless of the cause of the movement, if the vehicle has moved away from the loading dock at the conclusion of the loading/unloading process, it can put a load on the restraining member of the restraint system, whether the restraining member is a blocking member, a rotating hook, etc. Although this situation is not unsafe, it can lead to an operational issue referred to as "hook pinch." Hook pinch occurs with vehicle restraint systems when the restraining member is loaded by the transport vehicle to the extent that, when the dock operator attempts to disengage the restraining member from the RIG bar and return the restraint system to the stored position, the operator is unable to do so because of binding between the restraining member and the RIG bar caused by the vehicle load.

More specifically, in such situations the restraint system is not powerful enough to overcome the binding force and disengage the restraining member from the RIG bar. Typically, the only way to relieve this force so that the restraining member can be disengaged is to have the vehicle driver move the transport vehicle a slight distance back against the dock bumpers and away from the restraining member. This operation is called "bump-back," and can be a time-consuming effort in that it requires coordination between the dock operator and the transport vehicle driver. Accordingly, it would be advantageous to provide an improved vehicle restraint system that addresses the problem of hook pinch.

In many cases, the rotation of the hook or bar may be accomplished using a motor. Powering and maintaining such motors can not only add to the cost and complication of operating the vehicle restraints over the long haul, but may also cause complications in the event of a power outage. Meanwhile, the components employed to provide an effective vehicle restraint must be made robust, and therefore are typically difficult to move without a motor or some other powerful motive force. Thus, providing an effective vehicle restraint without a motor has been very difficult to achieve. Accordingly, it may be desirable to provide an improved vehicle restraint system that addresses this problem.

BRIEF SUMMARY OF SOME EXAMPLES

In an example embodiment, a vehicle restraint for restraining a vehicle or trailer at a dock may be provided. The vehicle restraint may include a vertical slide assembly, and a horizontal slide assembly. The vertical slide assembly may include a vertical biasing assembly, a vertical slide frame and a ramp assembly. The ramp assembly may slidably engage a RIG bar of the vehicle or trailer to lower the vertical slide frame from a resting height to a height of the RIG bar against a bias applied by the vertical biasing assembly. The horizontal slide assembly may include a restraining assembly and a locking assembly. The restraining assembly may be operably responsive to and by the movement of the RIG bar, without a motor, to transition between a receiving position for receiving or releasing the RIG bar and a locking means for retaining the RIG bar. The locking assembly may be operable to alternately lock and unlock the restraining assembly in the locking position.

In another example embodiment, a vehicle restraint system for restraining a vehicle or trailer at a dock may be provided. The vehicle restraint system may include a set of vertically mounted rails fixed to the dock, one or more bumpers mounted proximate to the rails, and a vehicle restraint operably coupled to the rails. The vehicle restraint may include a vertical slide assembly that includes a vertical biasing assembly, a vertical slide frame and a ramp assembly. The ramp assembly may slidably engaging a RIG bar of the vehicle or trailer to lower the vertical slide frame from a resting height to a height of the RIG bar against a bias applied by the vertical biasing assembly. The vehicle restraint may also include a restraining assembly operably responsive only to movement of the RIG bar to transition between a receiving position for receiving or releasing the RIG bar and one or more locking positions for retaining the RIG bar, and a locking assembly operably coupled to the restraining assembly to alternately lock and unlock the restraining assembly in the locking position.

In still another example embodiment, a restraining assembly for a vehicle restraint for restraining a RIG bar of a vehicle or trailer at a dock may be provided. The restraining assembly may include a hook. The hook may further include a locking arm at a first end thereof, a catch portion at a second end thereof, an axial orifice about which the hook rotates responsive to movement of the RIG bar in contact with the catch portion or the locking arm, and a cam surface disposed between the locking arm and the axial orifice. The hook may be rotatably mounted to a horizontal slide assembly of the vehicle restraint that slidably engages with the vertical slide assembly and RIG bar to cooperatively comply with the height of the RIG bar against a bias applied to the vertical slide assembly. The restraining assembly may be rotated only responsive to movement of the RIG bar to transition between a receiving position for receiving or releasing the RIG bar and a locking position for retaining the RIG bar.

In yet another example embodiment, a method of restraining a RIG bar of a vehicle or trailer at a dock using a restraint device may be provided. The method may include engaging the RIG bar by the restraint device responsive to horizontal motion of the RIG bar, actuating a locking member of the restraint device responsive to the horizontal motion of the RIG bar reaching an engagement position, retaining the RIG bar at the engagement position until the locking member is unlocked, and, responsive to unlocking the locking member, permitting horizontal motion of the RIG bar to reposition the locking member for a subsequent actuation.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
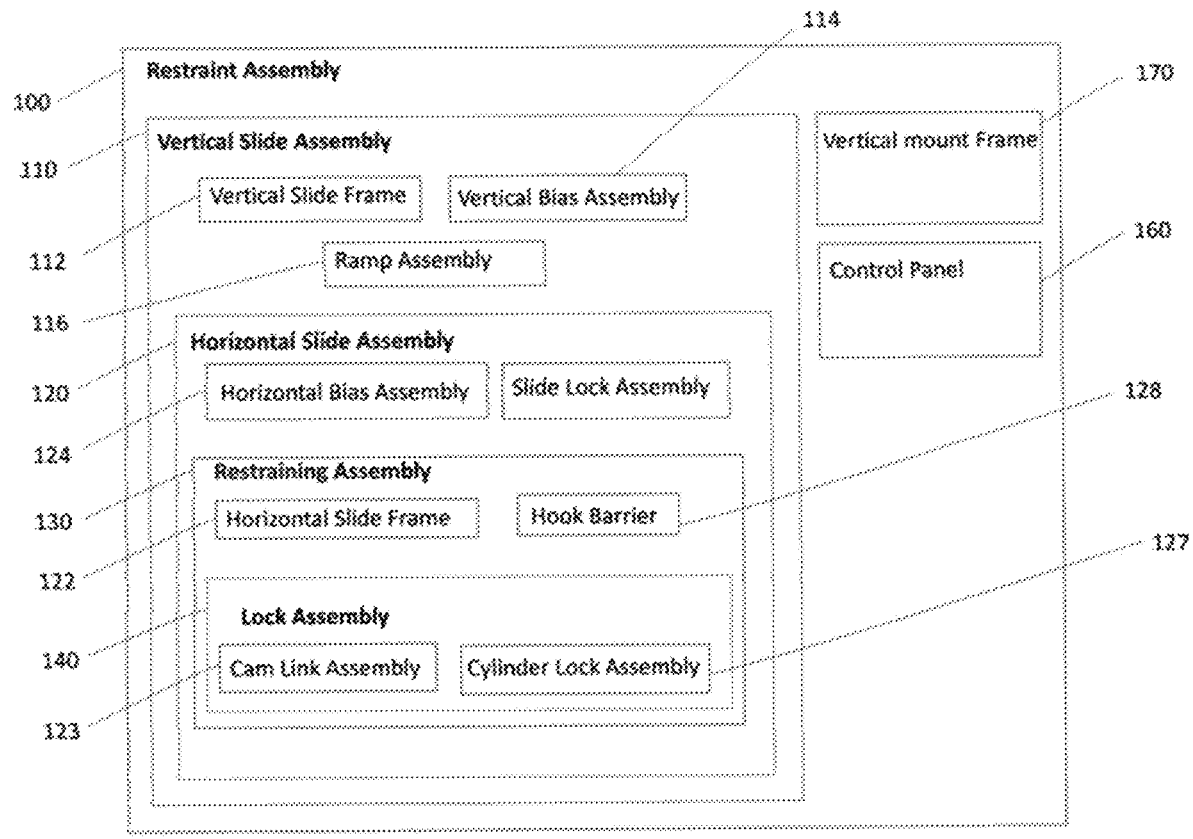
FIG. 1 illustrates a block diagram of a vehicle restraint system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Certain details are set forth in the following description and in the Figures to provide a thorough understanding of various embodiments of the present technology. In other instances, well-known structures, materials, operations and/or systems often associated with vehicle restraint systems, loading docks, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements.

As noted above, a typical vehicle restraint relies upon a motor for operation of the hook or other physical restraining device in one or both of the locking or unlocking operations. Eliminating the reliance upon such a motor may not only reduce power and maintenance requirements for the vehicle restraint, but may also improve reliability and efficiency. FIG. 1 illustrates a block diagram of a vehicle restraint 100 that may provide such improvements and eliminate any requirement for a motor.

Referring to FIG. 1, the vehicle restraint 100 may include two main assemblies of components that are interoperable and structured to cooperate in the restraining of a vehicle without using a motor. In an example embodiment, these two main assemblies may include a vertical slide assembly 110 and a horizontal slide assembly 120. The vertical slide assembly 110 may provide for movement vertically to accommodate respective different RIG bar heights on various different vehicles (or their trailers). To accomplish this, the vertical slide assembly 110 may include a vertical slide frame 112 providing a main body or base structure to which other components of the vertical slide assembly 110 attach, and to provide a structure for operable coupling to the horizontal slide assembly 120.

The vertical slide frame 112 may be disposed in a rest or home position by a vertical biasing assembly 114, and the RIG bar may engage a ramp assembly 116 to displace the vertical slide frame 112 out of the rest position as the RIG bar slidably engages the ramp assembly 116 until a locking height is reached. When the locking height is reached, the RIG bar may no longer engage the ramp assembly 116, and slides horizontally back into the hook barrier 130. The vertical slide frame 112 may remain substantially at the locking height for the remainder of the locking sequence of the vehicle restraint 100.

In an example embodiment, the vertical biasing assembly 114 may include vertically arranged rollers and one or more biasing members (e.g., springs) that bias the vertical slide frame 112 toward a base (or highest) height at the rest position. As the RIG bar rides along the ramp assembly 116, the spring (or springs) may be compressed (or extended) as the rollers move vertically downward to increase biasing forces on the vertical slide frame 112 back toward the rest position. When the RIG bar has advanced beyond the ramp assembly 116, the vertical slide frame 112 will achieve the locking height, and retain the locking height with corresponding biasing forces applied to the RIG so the vertical slide frame 112 remains in contact with the RIG until the RIG departs. To return the vertical slide frame 112 to the rest position, the RIG bar must operably move off the vertical slide frame no longer overcomes the biasing forces of the vertical biasing assembly 114.

The horizontal slide assembly 120 may provide for movement horizontally to transition (without a motor) the vehicle restraint 100 between an engaged (or locked) state with respect to the RIG bar and a disengaged (or unlocked) state with respect to the RIG bar position. To accomplish this, the horizontal slide assembly 120 may include a horizontal slide frame 122 providing a main body or base structure to which other components of the horizontal slide assembly 120 attach, and to provide a structure for operable coupling to the vertical slide assembly 110.

The horizontal slide frame 122 may be disposed in a stored (or rest) position by a horizontal biasing assembly 124, and the RIG bar may engage a portion of a restraining assembly 130 to displace (or carry) the horizontal slide frame 122 out of the horizontal stored position as the RIG bar slidably engages the restraining assembly 130 and the horizontal slide frame 122 until, as explained in greater detail below, a locking assembly 140 is operable via contact between the restraining assembly 130 and the RIG bar (responsive to motion of the RIG bar) to engage the restraining assembly 130 with the RIG bar and transition the horizontal slide assembly 120 (and thereby also the vehicle restraint 100) to the engaged state.

In an example embodiment, the horizontal biasing assembly 124 may include horizontally arranged rollers and one or more biasing members (e.g., springs) that bias the horizontal slide frame 122 toward the stored position. The horizontal biasing assembly 124 may, in an example embodiment, operably couple the horizontal slide frame 122 to the vertical slide frame 112. As the RIG bar engages the restraining assembly 130, such engagement during rearward travel of the RIG bar (e.g., toward the dock to which the vehicle restraint 100 is mounted), the motion may initially cause the restraining assembly 130 to rotate around the RIG bar to cause a portion of the restraining assembly 130 to wrap around an opposite side of the RIG bar to the side of the RIG bar that initially engages the restraining assembly 130. After the restraining assembly 130 stops rotation (e.g., due to being fully wrapped around the RIG bar), two further effects may ensue. In this regard, a locking assembly 140 may be operable to lock the locking assembly 140, which also locks the restraining assembly 130, which can be embodied as a hook. Alternatively, if the locking assembly 140 is not engaged in a lock, the RIG bar can be repositioned freely without capture until it is in a desired position for locking.

To accomplish these two effects, the locking assembly 140 may include a hook barrier 128, a locking cam assembly 123 and a lock cylinder 127 which locks the restraining assembly 130 when engaged. When the RIG bar is released restraining assembly 130 is uncoupled, the hook barrier 128 rotates downward, free of the RIG bar, which contacts the slide lock 144, unlocking the horizontal slide frame 122 and maintains the horizontal slide frame 122 unlocked (only while the hook barrier 128 is in the open or home position). The hook barrier 128 may operate unpowered (i.e., with no motor), and may in this example only operates based on movement of the RIG bar in contact with the restraining assembly 130. Thus, for example, the restraining assembly 130 may be structured to interact with the RIG bar to cause or enable the locking assembly 140 (and more specifically the hook barrier 128) to become locked when the restraining assembly 130 is fully rotated around the RIG bar. In an example embodiment, the hook barrier 128 may be hydraulically powered, and may prevent rotation of the restraining assembly 130 when locked. This prevention of rotation of the restraining assembly 130 retains the RIG bar in the engaged state. The hook barrier 128 may be released via an electronic signal, which may allow the restraining assembly 130 to rotate (again unpowered) based on contact with the RIG bar as the RIG bar (and vehicle) move away from the dock.

When the RIG bar has fully rotated the restraining assembly 130 and activated the hook barrier 128, the RIG bar may contact a portion of the horizontal slide frame 122 and begin to carry the horizontal slide frame 122 rearward (e.g., toward the dock). The movement of the horizontal slide frame 122 may cause the spring (or springs) of the horizontal biasing assembly 124 to be extend (or be compressed) to increase biasing forces on the horizontal slide frame 122, which urge the horizontal slide frame 122 away from the dock. The home or rest position of the horizontal slide assembly 120 is when it is furthest from the dock.

The slide lock 144 may be locked when the limit of travel of the horizontal slide frame 122 is reached, and may prevent horizontal movement of the horizontal slide frame 122 relative to the vertical slide frame 112. The slide lock 144 may be unlocked by rotation of the hook barrier 128 to the open position. In this regard, the restraining assembly 130 may, during rotation while in contact with the RIG bar, cause the slide lock 144 to unlock. The movement of the horizontal slide frame 122, after unlocking the slide lock 144 may permit the RIG bar to carry the horizontal slide frame 122 away from the dock. When the horizontal slide frame 122 reaches an end of its travel (e.g., when compressed) to a point where the horizontal slide frame 122 is proximate (or contacts) bumpers located on the dock, the slide lock 144 may be transitioned to the locked state thereby preventing further horizontal movement of the horizontal slide frame 122. The RIG bar may be fully engaged by the restraining assembly 130 and both the slide lock 144 and the hook lock 142 may be locked so that the RIG bar cannot be moved away from the dock and the vehicle restraint 100 is in the engaged state. The horizontal slide assembly 120, is free to move horizontally on slides mounted within the vertical slide frame 112 as long as the hook barrier 128 is fully retracted in the open position. Once the hook barrier 128 is rotated by the engagement of the RIG bar the slide lock assembly 144 engages, allowing the horizontal slide assembly 120 to only slide rearward (toward the dock). Forward travel is impeded by the slide lock 144 until the hook barrier 128 is returned home.

In an example embodiment, the slide lock 144 and the restraining assembly 130 may not contact each other when the restraining assembly 130 is rotated to the engaged state with the RIG bar. The slide lock 144 may therefore be enabled to transition to the locked state, and may in fact be biased toward the locked state in some embodiments. However, when the restraining assembly 130 is in an intermediate position (i.e., not fully rotated to the engaged state), the restraining assembly 130 may contact the slide lock 144 and transition the slide lock 144 to the unlocked state (overcoming any biasing). When in the engaged state, the restraining assembly 130 may therefore be held in position by both the hook lock 142 and the slide lock 144.

When ready to be disengaged, the hook lock 142 may be electronically released. Such release may allow the hook barrier 128 to rotate responsive to forward movement of the RIG bar. As the hook barrier 128 rotates, the restraining assembly 130 may unlock the slide lock 144 through contact therewith once the restraining assembly 130 reaches the intermediate position noted above. When the slide lock 144 is unlocked, the horizontal biasing assembly 124 may urge the horizontal slide frame 122 away from the dock as the RIG bar moves away from the dock until the limit of travel of the horizontal slide frame 122 away from the dock is reached. The hook barrier 128 may ultimately rotate to the point at which the RIG bar is released and continues to travel away from the dock. When the RIG bar reaches the ramp assembly 116, the RIG bar may ride down the ramp assembly 116 as the vertical slide frame 112 is repositioned upward to the rest position by the vertical biasing assembly 114. When the RIG bar is no longer in contact with the ramp assembly 116, the vehicle restraint 100 may be fully reset and ready for engagement with another RIG bar when the next vehicle arrives at the dock.

As can be appreciated by one of skill in the art, the assemblies described above may be instantiated in different ways with corresponding different individual components and component designs. Thus, FIGS. 2-9 will be used to describe various ones of such components that may be selected for employment in the vehicle restraint 100 and its respective assemblies shown in FIG. 1 in accordance with one example embodiment. Referring now to FIGS. 2-9 a vehicle restraint 200 that forms one example structure for the vehicle restraint 100 of FIG. 1 is shown. The vehicle restraint 200 may include or otherwise be operably coupled to a dock mounting structure 202, which may include rails 204 that extend vertically relative to the ground, and are spaced apart from each other extending parallel to each other. The mounting structure 202 may include metal brackets or the like for operable coupling to a dock via fasteners (e.g., bolts, screws, etc.)

Figure 2:
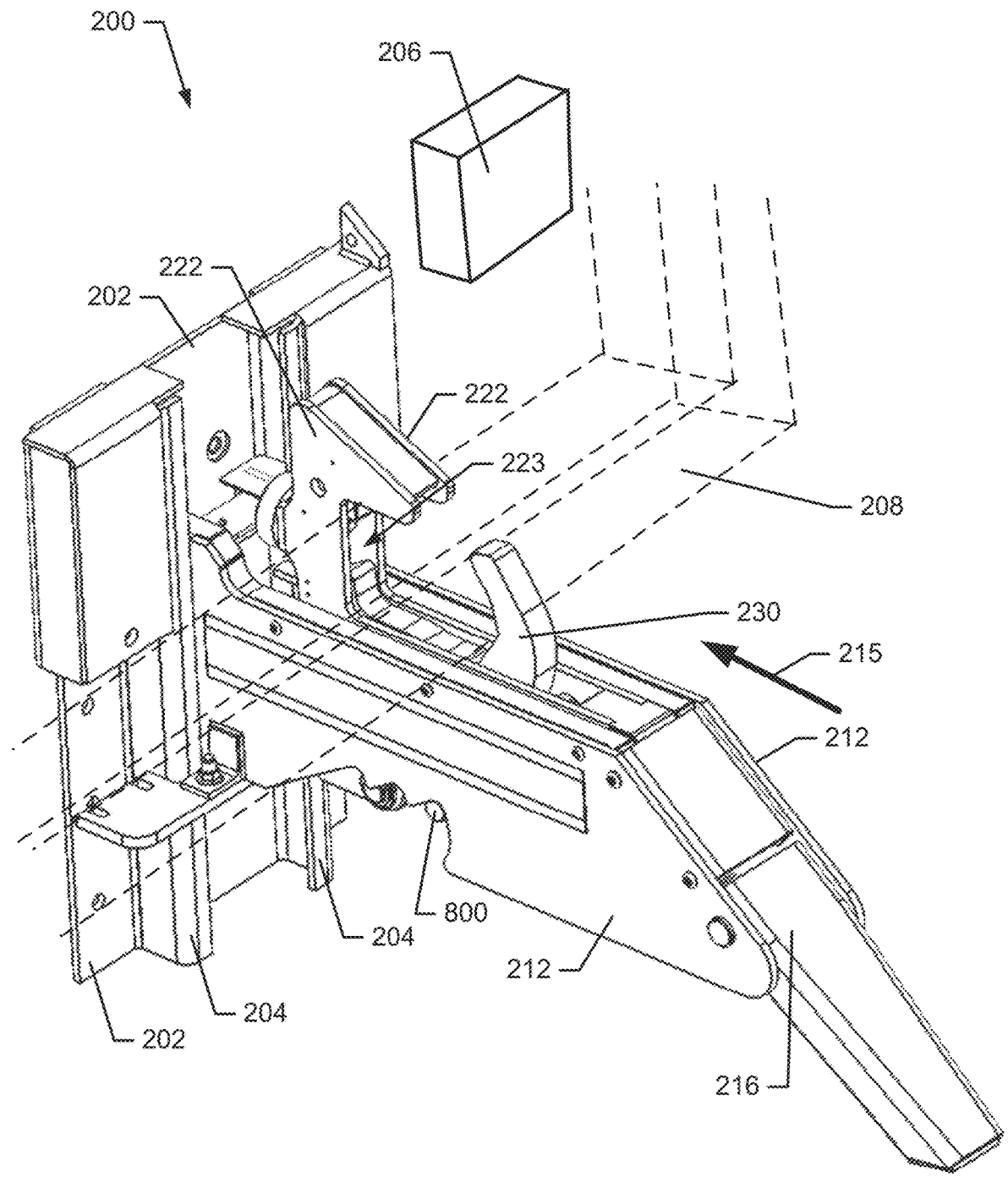
FIG. 2 shows a perspective view of a vehicle restraint in accordance with an example embodiment.
Figure 3:
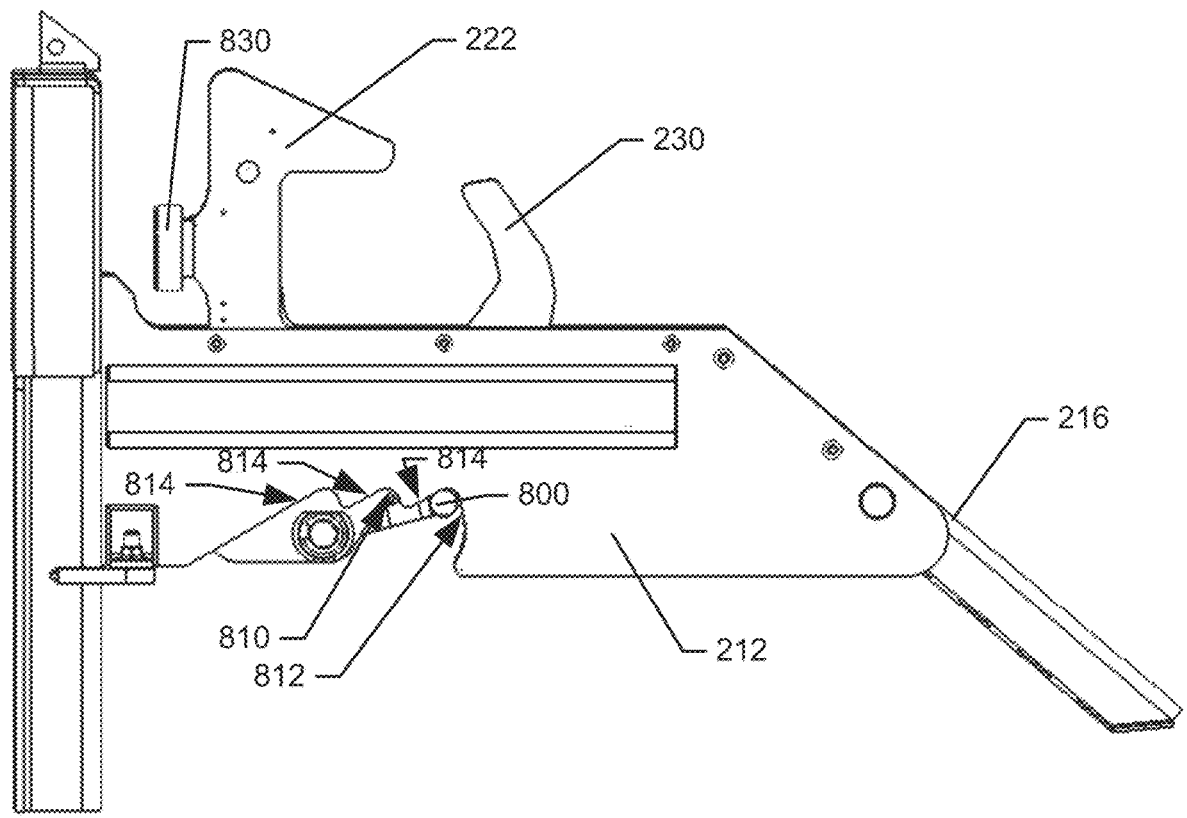
FIG. 3 illustrates a side view of the vehicle restraint with a hook thereof in a locking or retaining position according to an example embodiment.

The vertical slide frame 112 of FIG. 1 is embodied as vertical slide frame panels 212, which are provided on opposing lateral sides of the vehicle restraint 200, and best seen in FIGS. 2 and 3. The vertical slide frame panels 212 are operably coupled to ramp member 216, which is an example of the ramp assembly 116 of FIG. 1. The vertical slide frame panels 212 of this example are affixed to opposing lateral edges of at least a portion of the ramp member 216 via one or more fasteners. The ramp member 216 of this example extends at about a 45 degree angle relative to a top surface of the vertical slide frame panels 212. However, the angle could vary in alternative embodiments and may be, for example, from 20-70 degrees.

Figure 5:
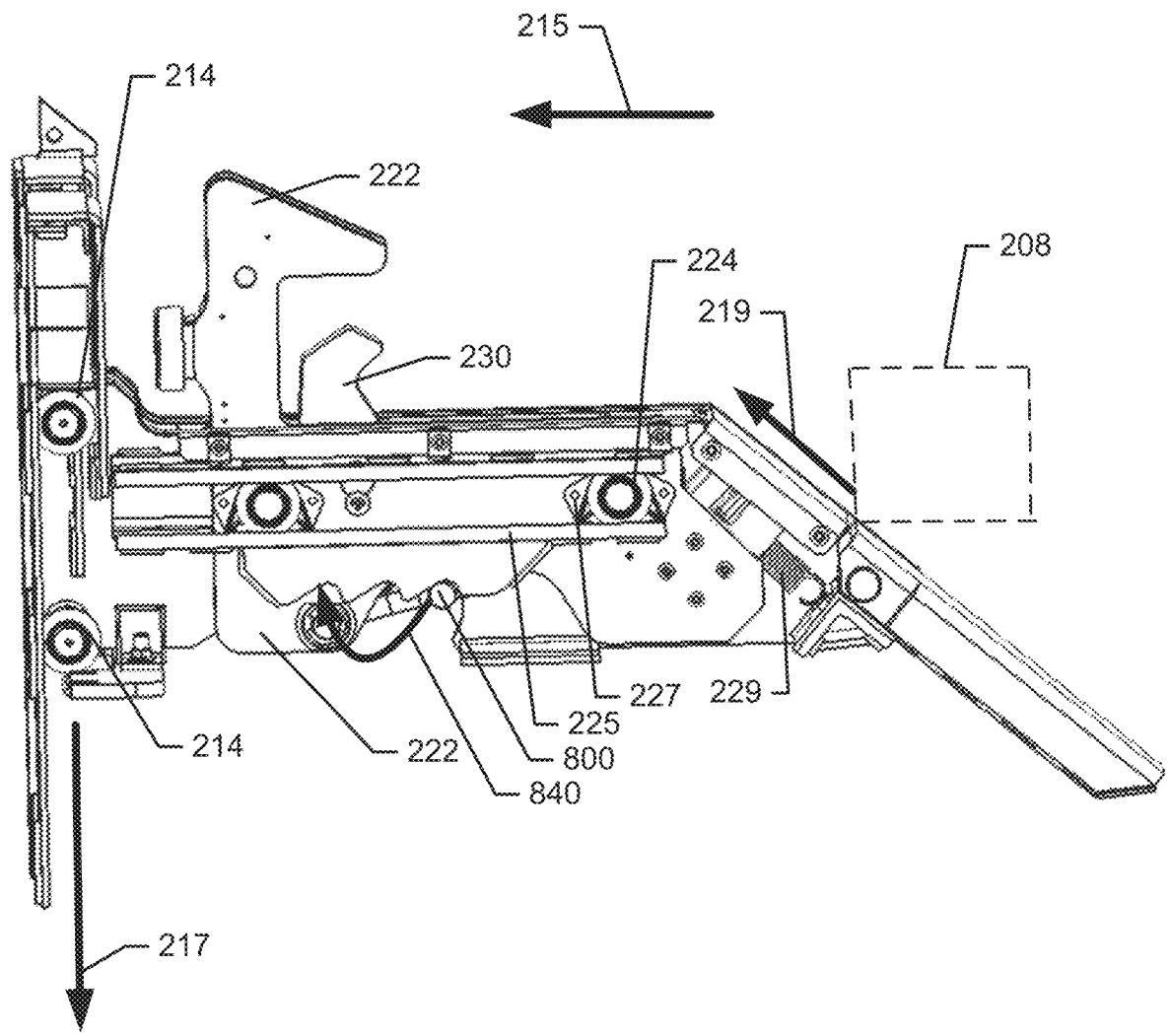
FIG. 5 shows a side view of the vehicle restraint of FIG. 4 with vertical slide side panel removed to provide visibility to various internal components of the vehicle restraint in the receiving position according to an example embodiment.

FIG. 5 shows one of the rails 204, and one of the vertical slide frame panels 212 removed so that rollers 214, which form (along with a spring (not shown)) an example of the vertical biasing assembly 114 of FIG. 1, can be seen. The rollers 214 may ride within the rails 204 and may be biased to the rest position, as discussed above, by the spring. However, when the RIG bar 208 hits the ramp member 216, the ramp member 216 may transfer the force of the RIG bar 208 moving rearward (i.e., toward the dock) in the direction of arrow 215 into a downward force on the vertical slide frame panels 212 to overcome the spring and enable the rollers 214 to slide down the rails 204 moving the vertical slide frame panels 212 downward as shown by arrow 217, as the RIG bar 208 slides along a surface of the ramp member 216 as shown by arrow 219.

From the descriptions above, it can be appreciated that the vertical slide frame panels 212, the rollers 214, the spring, and the ramp member 216 provide an example set of structures that may form the vertical slide assembly 110 of FIG. 1. Meanwhile, the horizontal slide assembly 120 of FIG. 1 may also be embodied in various alternative structures including, for example, the horizontal slide frame 122 of FIG. 1 may be embodied as horizontal slide frame panels 222, which extend parallel and spaced apart from each other to define a hook channel 223.

The horizontal biasing assembly 124 of FIG. 1 may be embodied by rollers 224 that ride in a set of rails 225 disposed on opposite sides of the horizontal slide frame panels 222. In this regard, the rails 225 may be mounted on internal sides of the vertical slide frame panels 212, and the rollers 224 may be rotatably mounted to the horizontal slide frame panels 222. In some cases, the rollers 224 may be housed in a roller wiper 227 (or shield) that is provided to keep the rails 225 and the rollers 224 clean. A spring 229 (or springs) may be provided as noted above to bias the horizontal slide frame panels 222 away from the bumpers 206 and the dock (which is opposite the direction of arrow 215). However, it should be appreciated that the rails 225 and rollers 224 could be mounted on opposite structures, and the same operating principle could apply.

Figure 6:
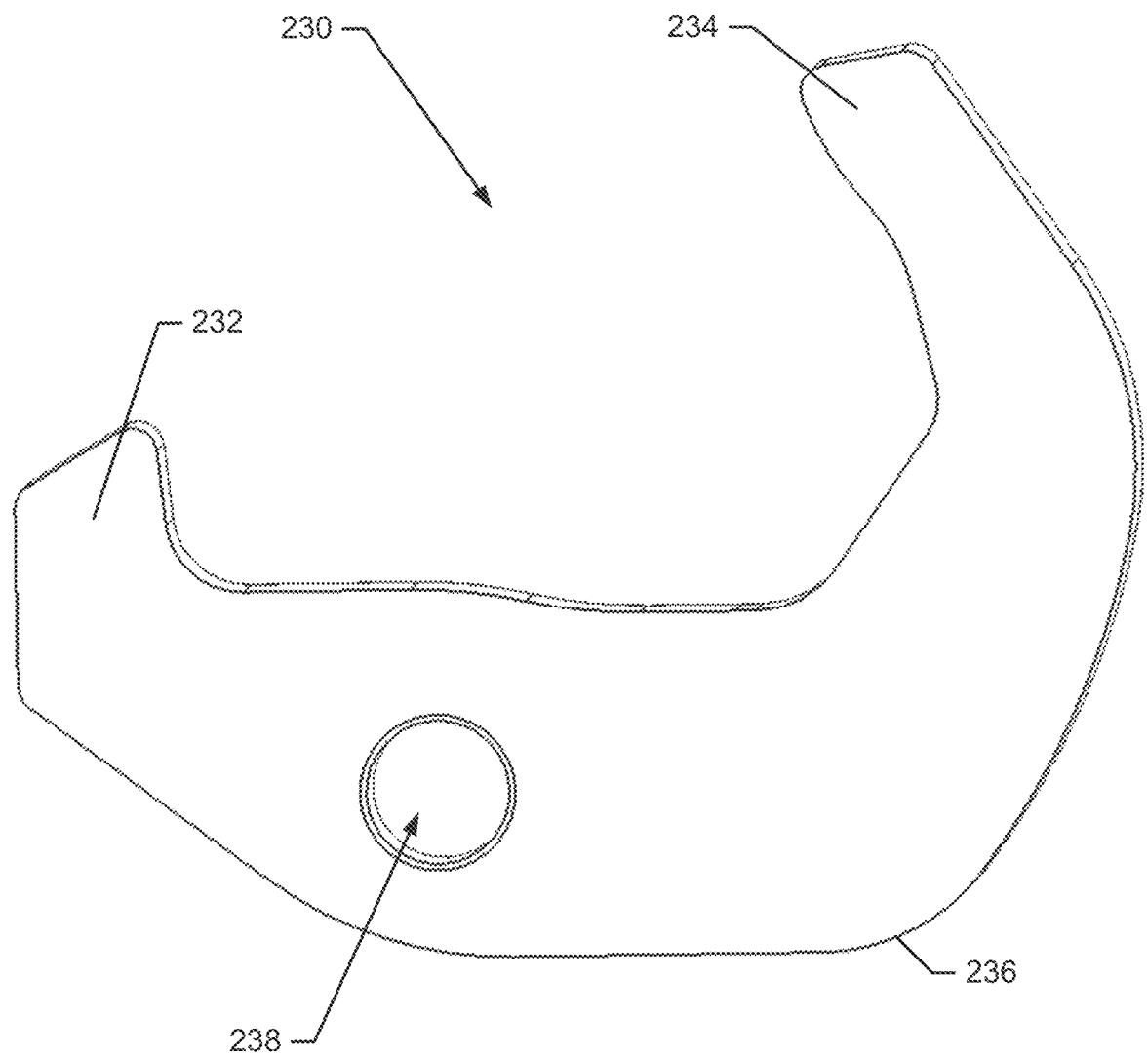
FIG. 6 illustrates a side view of a hook that may form a restraining device of a restraining assembly in accordance with an example embodiment.

The restraining assembly 130 of FIG. 1 may be embodied by hook 230, which is shown in isolation in FIG. 6. The hook 230 may include a catch portion 232, a locking arm 234, and a cam surface 236. The hook 230 may also include axial orifice 238 about which the hook 230 may pivot inside the hook channel 223. An axial retaining member may extend between the horizontal slide frame panels 222 and through the axial orifice 238 to form the pivot axis about which the hook 230 rotates. The hook 230 may not have any motive force applied thereto by any other component of the vehicle restraint 200. The hook 230 may therefore receive all motive force for engaging and disengaging from the RIG bar 208 itself. Other structures of the vehicle restraint 200 may simply operate on, with, or responsive to contact with the hook 230 to lock, unlock, slide, or otherwise perform their respective and various functions.

Figure 4:
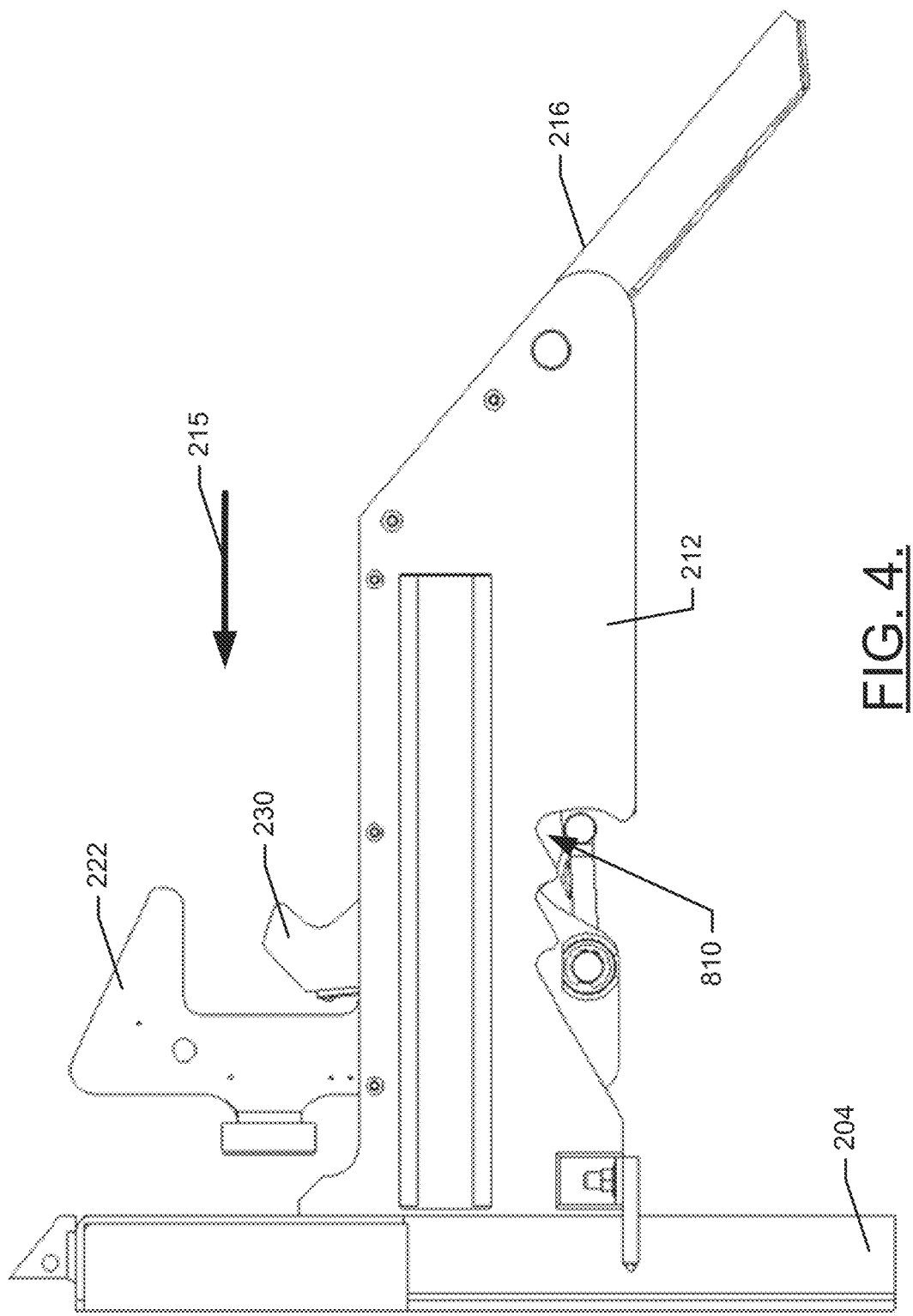
FIG. 4 shows a side view of the vehicle restraint with the hook rotated to a receiving position according to an example embodiment.
Figure 7:
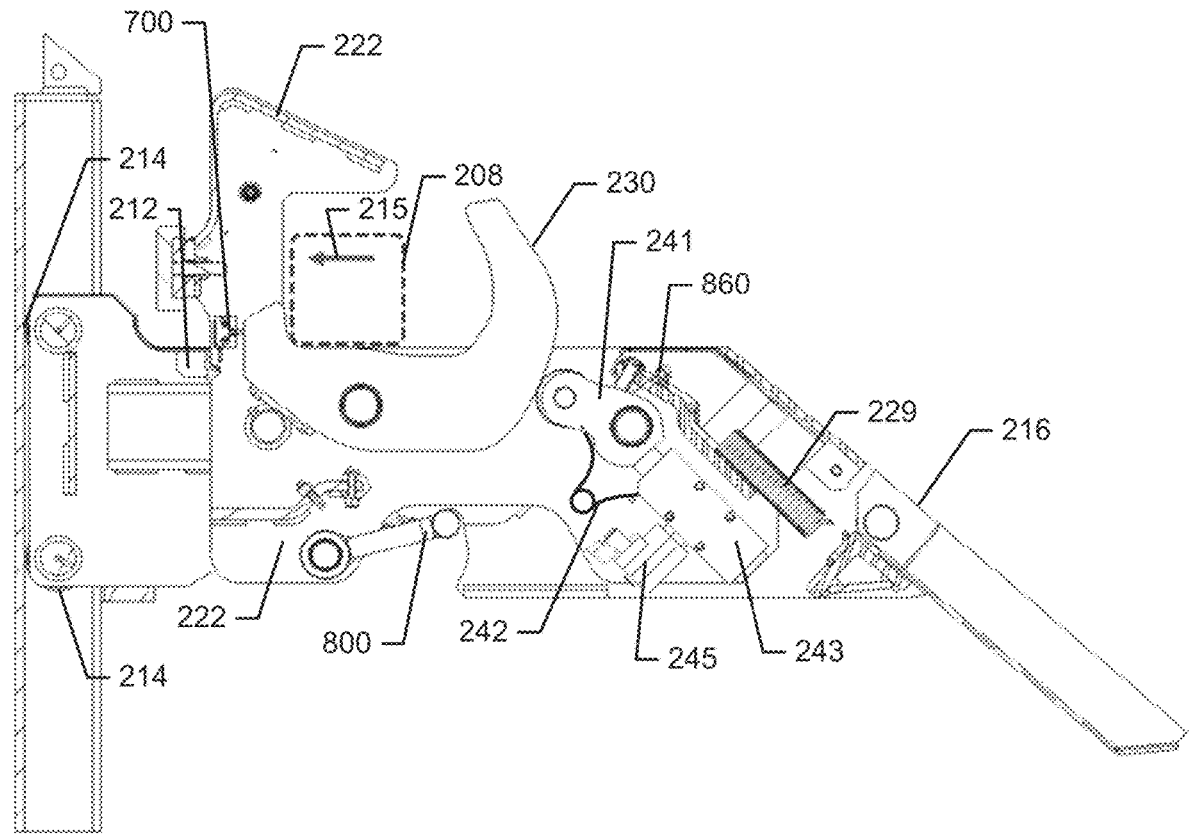
FIG. 7 shows a side view of the vehicle restraint of FIG. 3 with inner most side panel removed of the horizontal slide to provide visibility to various internal components of the vehicle restraint in the locking position according to an example embodiment.
Figure 8:
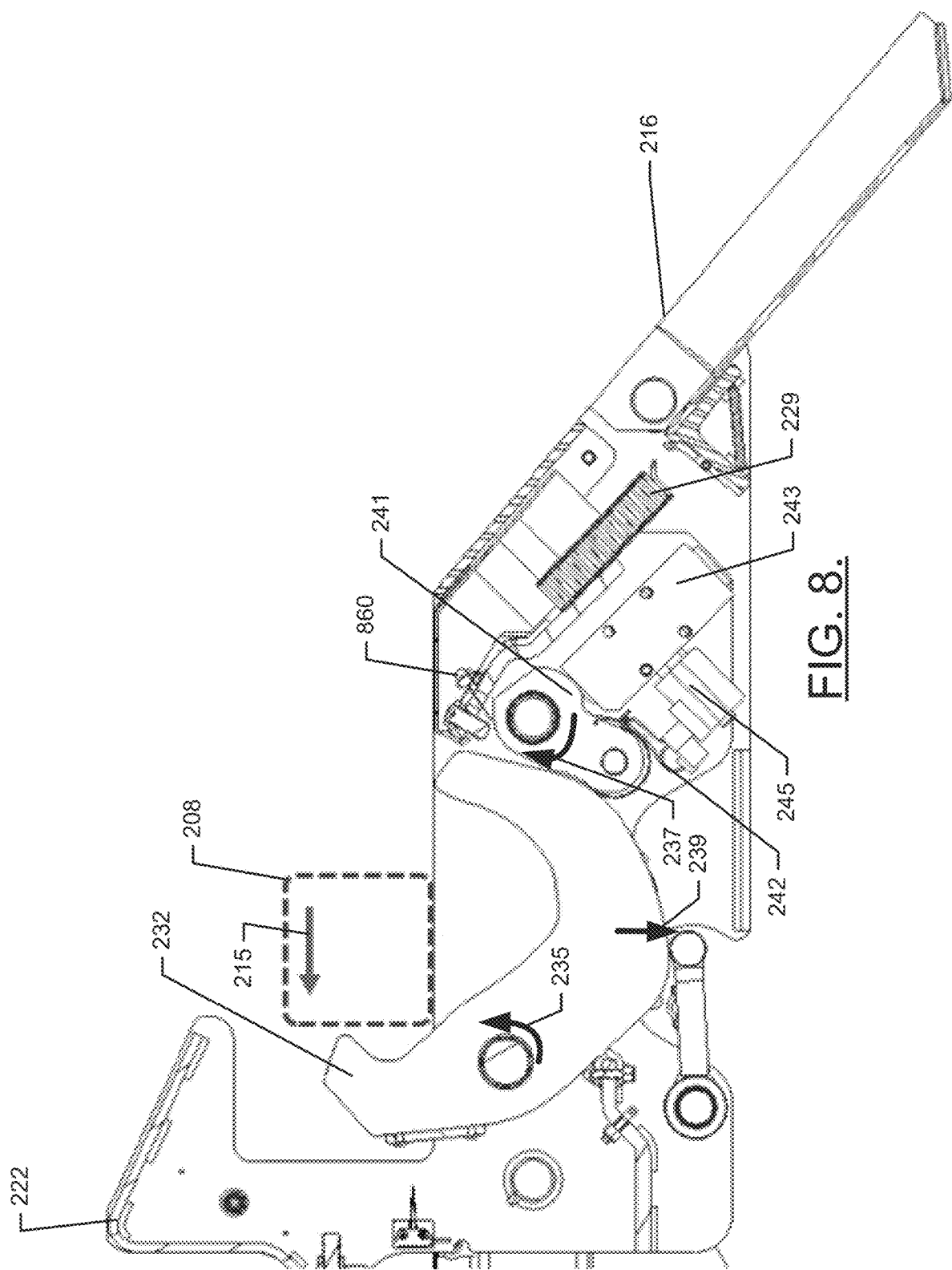
FIG. 8 illustrates a side view with more componentry removed to show an interaction between a hook and cam roller initially in a receiving position in accordance with an example embodiment.
Figure 9:
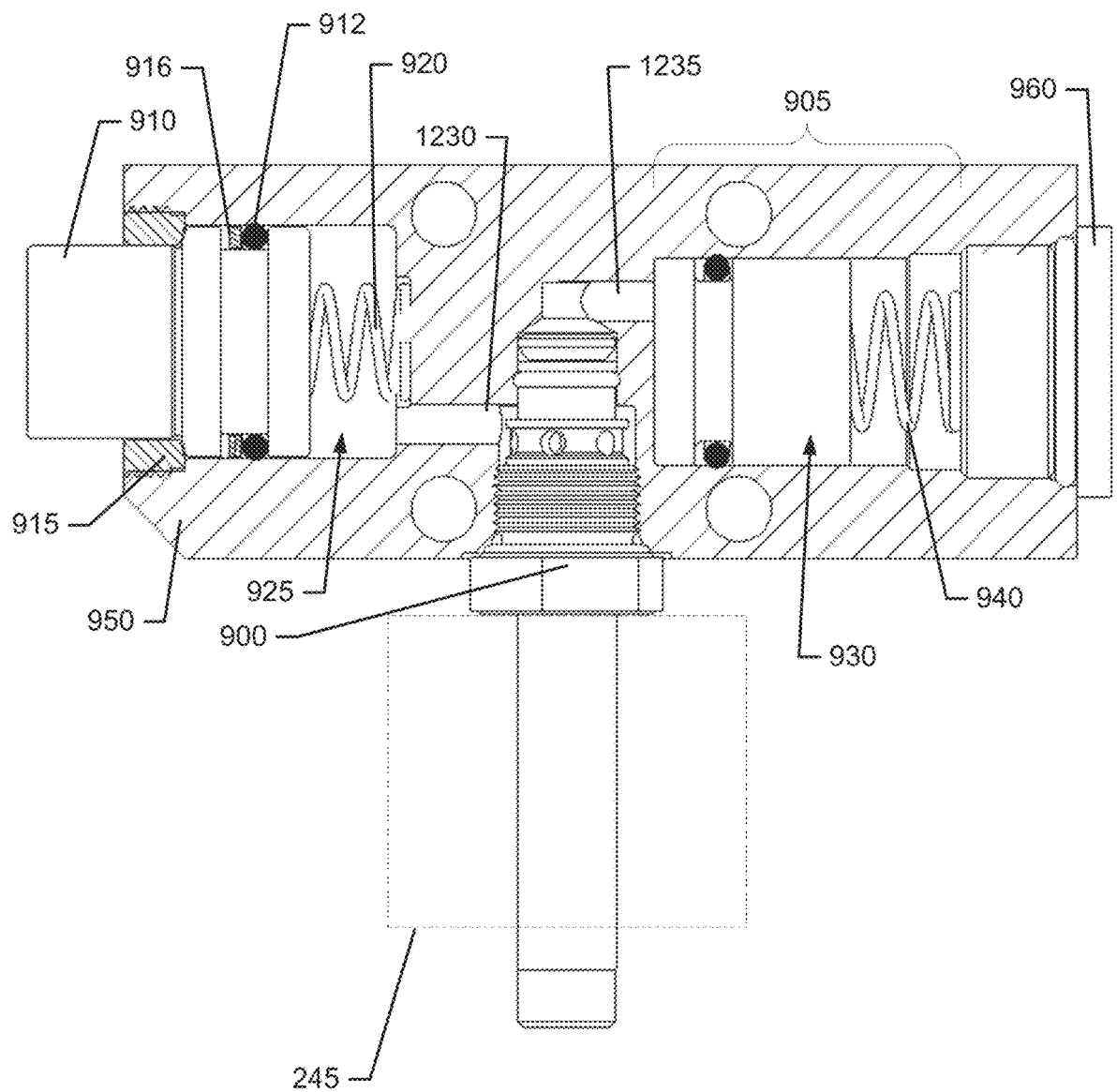
FIG. 9 illustrates an isolated side view of internal components of a hydraulic cylinder assembly of a hook lock in accordance with an example embodiment.

In an example embodiment, the hook 230 may have multiple positions in which the hook 230 may be positioned. In this regard, for example, FIGS. 2, 3 and 7 illustrate the hook 230 in a locking position in which the RIG bar 208 may be locked or retained in the engaged position. Meanwhile, FIGS. 4, 5 and 8 illustrate the hook 230 in a receiving position, in which the hook 230 is ready to receive the RIG bar 208 and begin a locking sequence for the RIG bar 208. Notably, however, the hook 230 also ends the unlocking sequence in the receiving position so as to be ready to receive the RIG bar 208 when another locking sequence is initiated.

When in the receiving position, generally only the catch portion 232 of the hook 230 may be exposed from the hook channel 223. All other portions of the hook 230 may be recessed inside of the hook channel 223 and therefore may not contact the RIG bar 208 or block progress of the RIG bar 208 as the RIG bar 208 slides along the top surface of the vertical slide frame panels 212 moving in the direction of arrow 215. In some embodiments, a sensor 700 (see FIG. 7) may be provided to detect when the catch portion 232 of the hook 230 is located in the receiving position, and/or when the catch portion 232 of the hook 230 is rotated to the locking position. The sensor 700 may be used to indicate the receiving position, and readiness of the vehicle restraint 200 to be engaged by a RIG bar of a trailer via one or more lights presented to either or both of the driver of the vehicle engaged with the trailer, and workers at the dock. For example, when the sensor 700 detects the hook 230 in the receiving position, the light presented to the driver may be green (inviting engagement with the vehicle restraint 200), while the light presented to the workers at the dock may be red (indicating that the vehicle restraint 200 is not engaged, and therefore it is not yet time to begin work loading or unloading the trailer). Meanwhile, again by way of example, the sensor may detect the hook in the locking position and present a red light to the driver to indicate that the vehicle restraint 200 is engaged and forward travel should not be attempted, and a green light to the workers at the dock to indicate that the vehicle restraint 200 is engaged, and therefore the work of loading or unloading the trailer may begin.

When the RIG bar 208 hits the catch portion 232 moving rearward in the direction of arrow 215, as shown in FIG. 8, the hook 230 may begin to rotate about the axial orifice 238 in the direction of arrow 235. During rotation of the hook 230 in the direction of arrow 235, the locking arm 234 may extend upward (out of the hook channel 223) and around the RIG bar 208. A cam link 241 may, biased by a spring 242, also ride against the hook 230 along cam surface 236. As the cam roller 248 rides along the hook 230 from the locking arm 234 portion to the cam surface 236, more space is provided between the hook 230 and the cam roller 241 along surface 1320 by the cam lock bias spring 242, which pivots the cam link 241 in the direction of arrow 237 from the position of FIG. 8 to the position of FIG. 7. In FIG. 7, the cam link 241 is in a locking position and may (if prevented from rotating) lock and hold the hook 230 in the locking position.

When the cam link 241 is in the locking position of FIG. 7, and locking of the hook 230 is desired, a hydraulic cylinder assembly 243 may be actuated to prevent the cam link 241 from rotating. The hydraulic cylinder assembly 243, which is shown in greater detail in FIG. 9, may be operated by a solenoid 245. In this regard, the hydraulic cylinder assembly 243 may be installed in a manifold assembly 950 that includes a hydraulic reservoir 905, solenoid valve 900, lock piston 910, piston return spring 920, reservoir piston 930, reservoir return spring 940, retainer nut 915, hydraulic fluid 925 and spring cap 960. The retainer nut 915 may be disposed proximate to an O-ring 912 and a backer ring 916 in some cases. The solenoid valve 900 may be normally open, and therefore be actuated to close. When open, the solenoid valve 900 may enable both a lock piston 910 that is biased by a first return spring 920 toward engagement (extended) with the cam link 241, and a reservoir piston 930 biased by a second return spring 940 to freely move between a locking position and a non-locking position via conduits 1230, 1235, 1240. When the lock piston 910 engages the cam roller 241 to inhibit rotation of the cam link 241 and thereby lock the hook 230 in the locking position (and the vehicle restraint 200 in the engaged position). When closed, the solenoid valve 900 blocks flow transferring from the lock piston cavity 1210 to the reservoir cavity 1220 in the manifold 950, thereby preventing retraction of lock piston 910, thereby locking rotation of the cam link 241. As can be appreciated from the description above, the hydraulic cylinder assembly 243, the cam roller and the spring 242 may combine to form the hook lock 142 of FIG. 1.

When the RIG bar 208 reaches the position of FIG. 8, and continues to move in the direction of arrow 215, the RIG bar 208 may carry the hook 230 into rotation as shown by arrow 235 (and described above), and the cam link 241 may cooperatively rotate in the direction of arrow 237 while the cam roller 248 rides against the hook 230 along the cam surface 236. During release of RIG 208 the rotation of the hook 230 in the opposite direction of arrow 235, the cam surface 236 may initially be thrust downward in the direction of arrow 239, and may displace slide lock arm 800 out of corresponding locking slots 810, in FIG. 3, which may be provided at a bottom portion of the vertical slide frame panels 212. In some cases, the locking slots 810 may be formed in a separate component attached rigidly to the vertical slide frame panels 212, whereas the slide lock arm 800 may be rotatably mounted to the horizontal slide frame panels 222. The locking arm 800 and the locking slots 810, along with a biasing spring 820, which urges the slide lock arm 800 toward contact with the locking slots 810 may form the slide lock 144 of FIG. 1.

The hook 230 rotates about the orifice 238 in direction 235 when contact with RIG bar 208 in direction 215, allows the slide lock arm 800 to engage with the locking slots 810 (all in FIG. 8) may further urge the slide lock arm 800, against the biasing of the biasing spring 820, out of one of the corresponding locking slots 810 and down the adjacent slot ramps 814, thereby release the slide lock arm 800 to allow the horizontal slide frame panels 222 to be carried rearward (i.e., toward the dock and the bumpers 206) during further rearward movement of the RIG bar 208 in the direction of arrow 215. This rearward movement may continue until the vehicle contacts the bumpers 206 or impacts the snubber 830 and reaches (or nearly reaches) contact with the mounting structure 202 to limit rearward movement of the horizontal slide frame panels 222 relative to the vertical slide frame panels 212. When the horizontal slide frame panels 222 has moved relative to the vertical slide frame panels 212 to the limit of rearward movement, the slide lock arm 800 may move from the most forward one of the locking slots 810 to the most rearward one of the locking slots 810 (as shown by arrow 840 in FIG. 5).

As a result of the engagement of the slide lock arm 800 into the most rearward one of the locking slots 810 (indicated by arrow 840), the vehicle restraint 200 may be engaged, and the RIG bar 208 may be prevented from movement away from the dock (i.e., movement opposite the direction of arrow 215) provided the lock cylinder 243 is engaged and activated. Notably, spring 242 (see FIG. 7) keeps a constant load on the cam link 241 to ensure the cam roller 248 stays in contact with hook 230 along cam surface 236. A sensor 860 is installed adjacent to the cam link 241 to confirm the link is in position and to indicate that the hook 230 is in the lock position and ready to begin a locking sequence. Meanwhile, the solenoid valve 900 may be operated to lock the hydraulic cylinder assembly 243 to initiate an locking sequence. At this point the vehicle restraint is in a lock condition and loading/unloading operations may proceed.

After loading/unloading operations are complete, the restraint may be disengaged whereby the hydraulic cylinder assembly 243 releases the lock piston 910, the cam link 241 may be free to rotate. Forward movement of the RIG bar 208 (i.e., away from the dock and opposite the direction of arrow 215) may then carry the hook 230 into rotation opposite the direction of arrow 235, which will again thrust the cam surface 236 downward as shown by arrow 239 and unlock the slide lock 144 by forcing the locking arm 800 out of the locking slots 810. Continued forward movement of the RIG bar 208 will carry the hook 230 to the position shown in FIG. 8, and the biasing of the horizontal slide frame panels 222 relative to the vertical slide frame panels 212 will continue relative movement therebetween until the limit of forward movement is impeded by contact of the locking arm 800 on the stop surface 812 is reached. At this point, the RIG bar 208 may continue to slide along the top surfaces of the horizontal slide frame panels 222 and the vertical slide frame panels 212 until the ramp member 216 is reached. The RIG bar 208 may continue in the forward direction, and the ramp member 216 may ride the RIG bar 208 upward (opposite the direction of arrow 219) and the vertical slide frame panels 212 may move upward (opposite the direction of arrow 239) until the RIG bar 208 no longer contacts the ramp member 216 and the vehicle restraint 200 is fully reset and ready to receive a next RIG bar.

Figure 10:
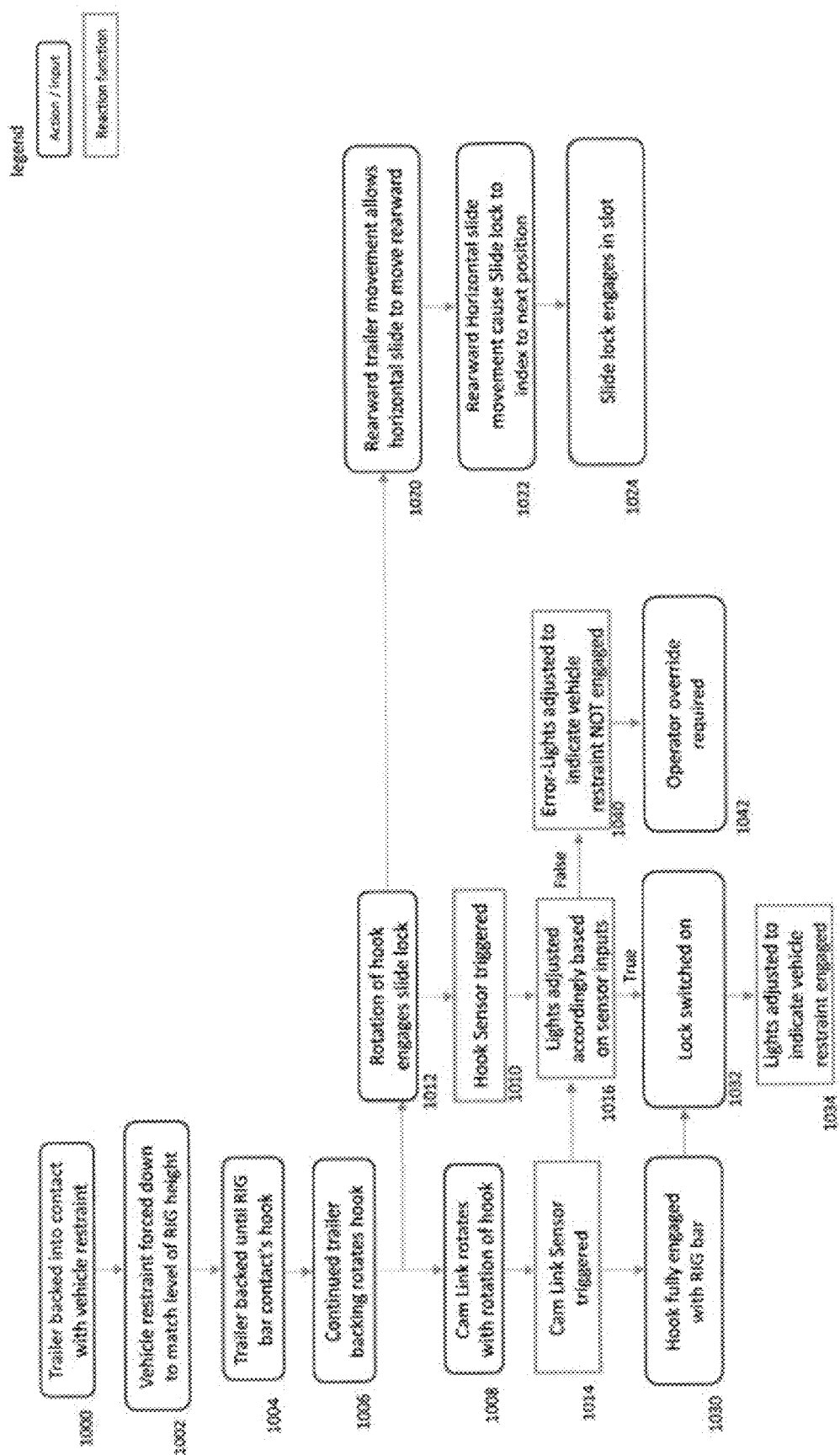
FIG. 10 illustrates a block diagram of a locking sequence in accordance with an example embodiment.

FIG. 10 illustrates a block diagram describing a full locking sequence in accordance with an example embodiment. Initial conditions prior to initiation of the locking sequence may include the backing of a trailer including an instance of the RIG bar 208 toward the dock with the vertical slide frame panels 212 fully extended to the rest position (or highest height thereof). The locking arm 800 may also be fully forward (e.g., in the most forward one of the locking slots 810) and the hook 230 may be in the receiving position (shown in FIGS. 4, 5 and 8). The cam link 241 may be fully extended or stored (as also shown in FIG. 8).

As shown in FIG. 10, the trailer may initially be backed into contact with the vehicle restraint at operation 1000. The vehicle restraint may contact the RIG bar of the trailer and drive the vehicle restraint downward to a level that matches a height (at the bottom) of the RIG bar at operation 1002. The trailer may continue to back until contact with the hook at operation 1004. Continued backing of the trailer may then rotate the hook at operation 1006. The cam link 241 may rotate cooperatively with rotation of the hook barrier 230 at operation 1008. The hook may rotate to the locking position (fully deflected) and trigger a hook sensor 700 to indicate position at operation 1010. The rotation of the hook may also engage the slide lock at operation 1012. The cam link 241 may likewise fully rotate (with full rotation of the hook) and trigger a cam sensor 860 to indicate position at operation 1014. Thereafter, based on the hook and cam sensors, any light adjustments may be made accordingly at operation 1016.

Continued rearward movement of the trailer at operation 1020 will move the horizontal slide assembly rearward (toward the dock) and index the slide lock arm 800 to the next tooth. Such rearward movement of the horizontal slide assembly causes the slide lock to adjust (e.g., over serrations or receiving slots) until the bumper is reached at operation 1022. At this travel limit, the slide lock engages at it's rear most position of operation 1024.

The hook may reach full rotation and be engaged with the RIG bar at operation 1030. The hook lock may engage to prevent rotation of the cam roller and hook at operation 1032. Lights indicating that the vehicle restraint is engaged and that it is safe conditions to work, and to prevent repositioning of the trailer by the driver may correspondingly be lit at operation 1034.

Figure 11:
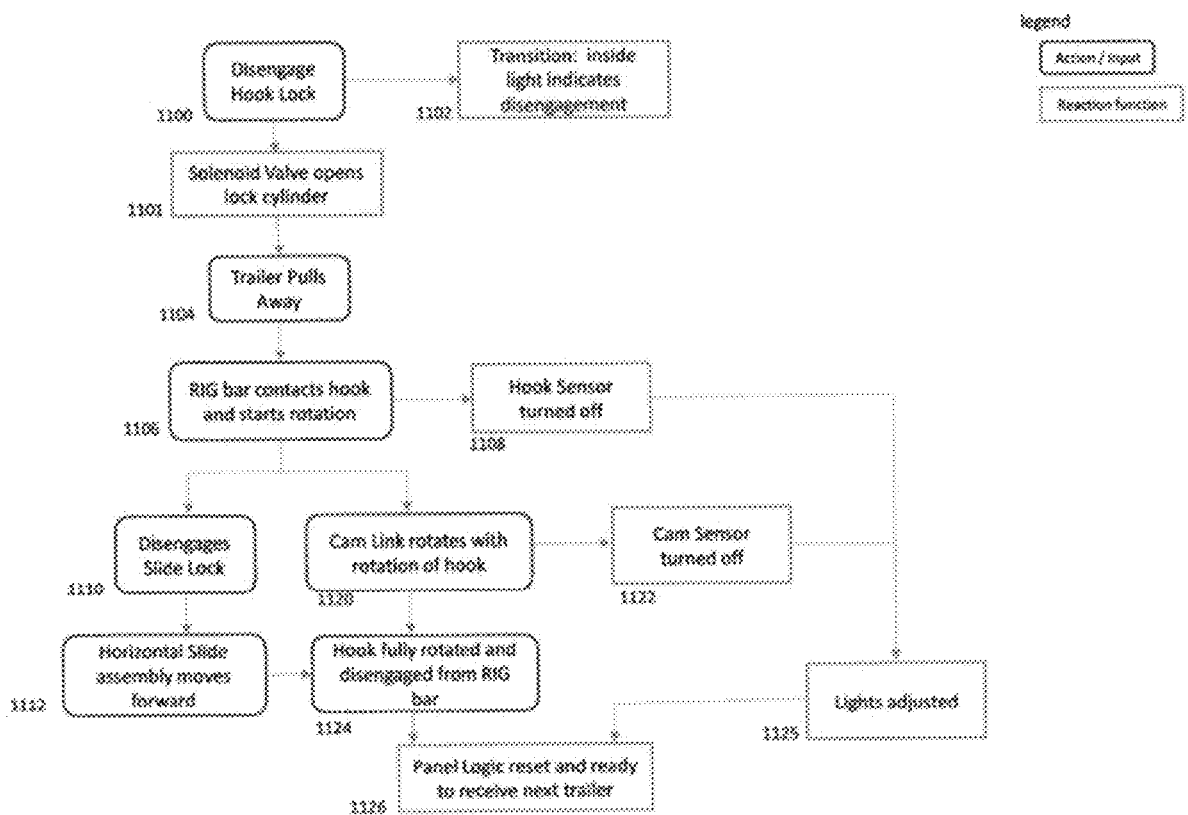
FIG. 11 illustrates a block diagram of an unlocking sequence in accordance with an example embodiment.
Figure 12:
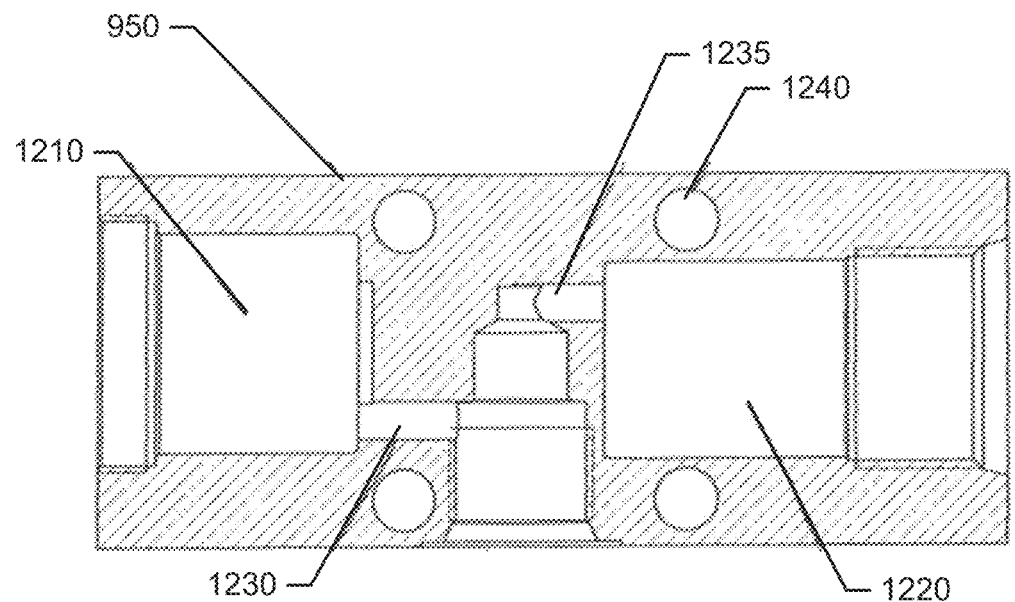
FIG. 12 illustrates an isolated view of a cylinder body cavity and port detail therein in accordance with an example embodiment.
Figure 13:
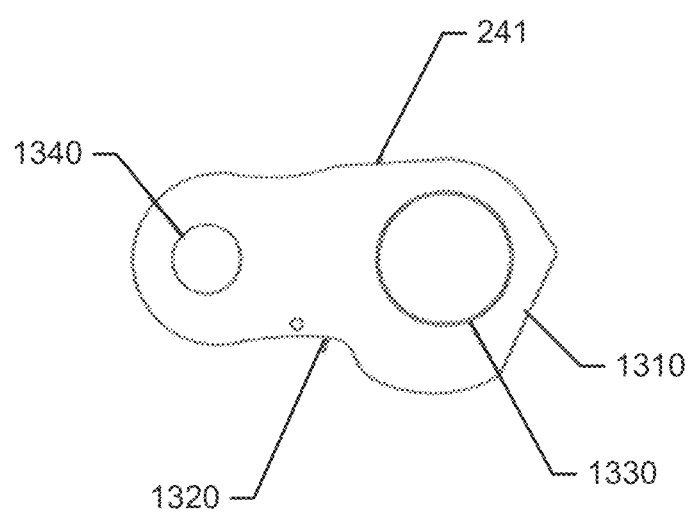
FIG. 13 illustrates an isolated view of a cam lock body in accordance with an example embodiment.
Figure 14A:
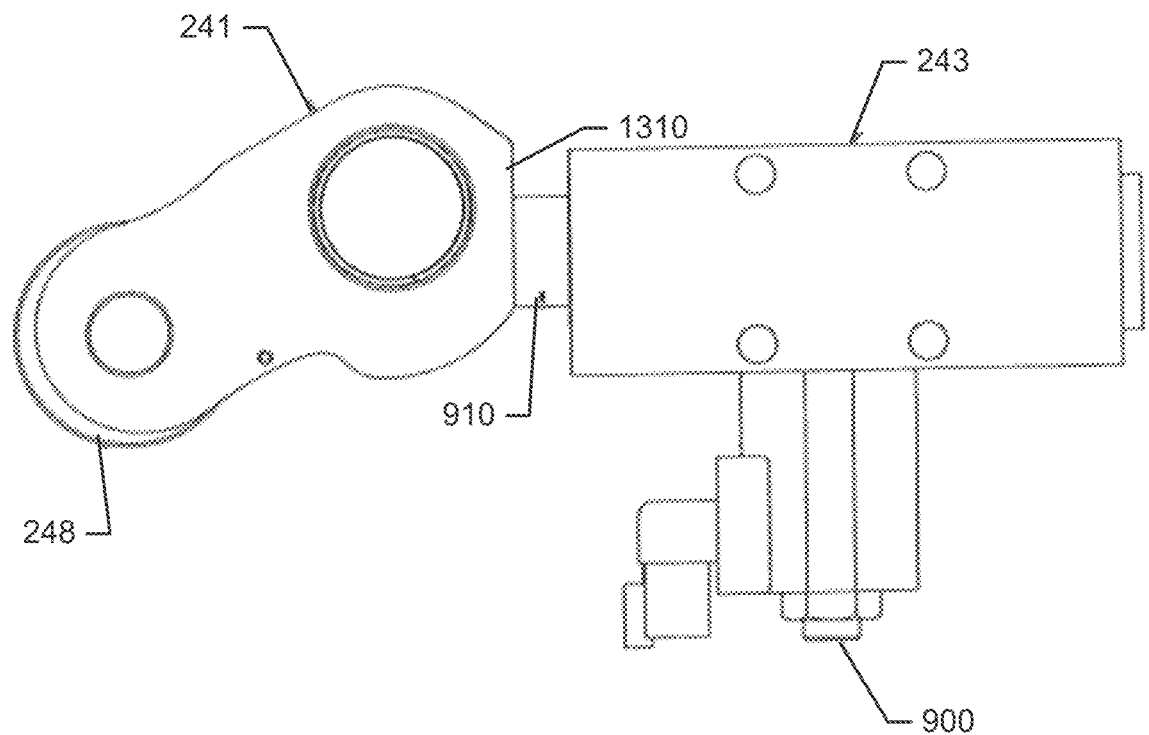
FIG. 14A illustrates a cam lock assembly in isolation and engaged locking cylinder in a locked state in accordance with an example embodiment.
Figure 14B:
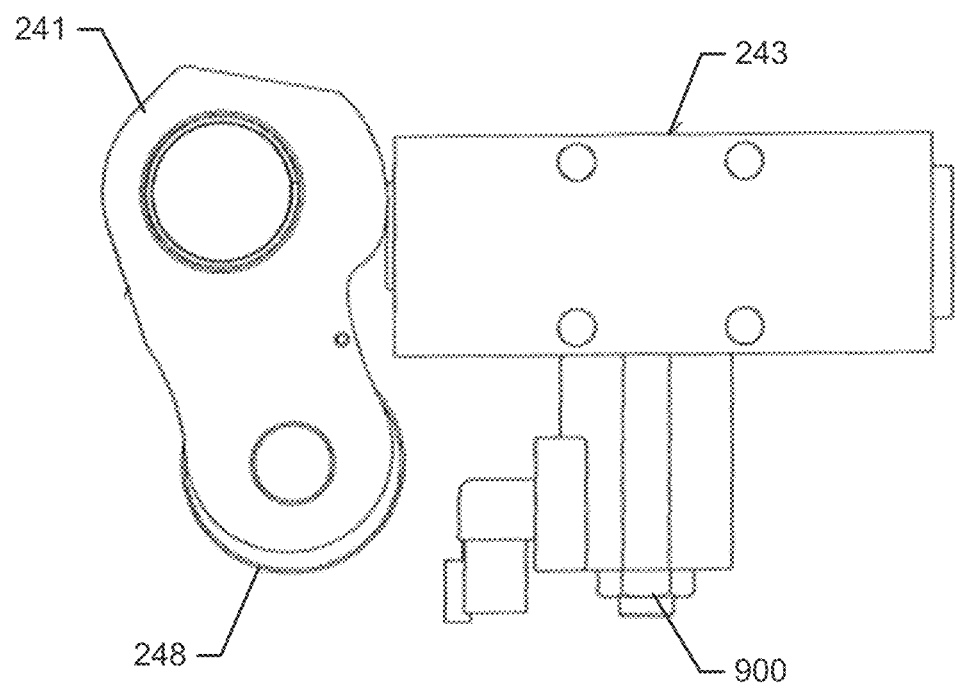
FIG. 14B illustrates the cam lock assembly of FIG. 14A in an unlocked state in accordance with an example embodiment.
Figure 15A:
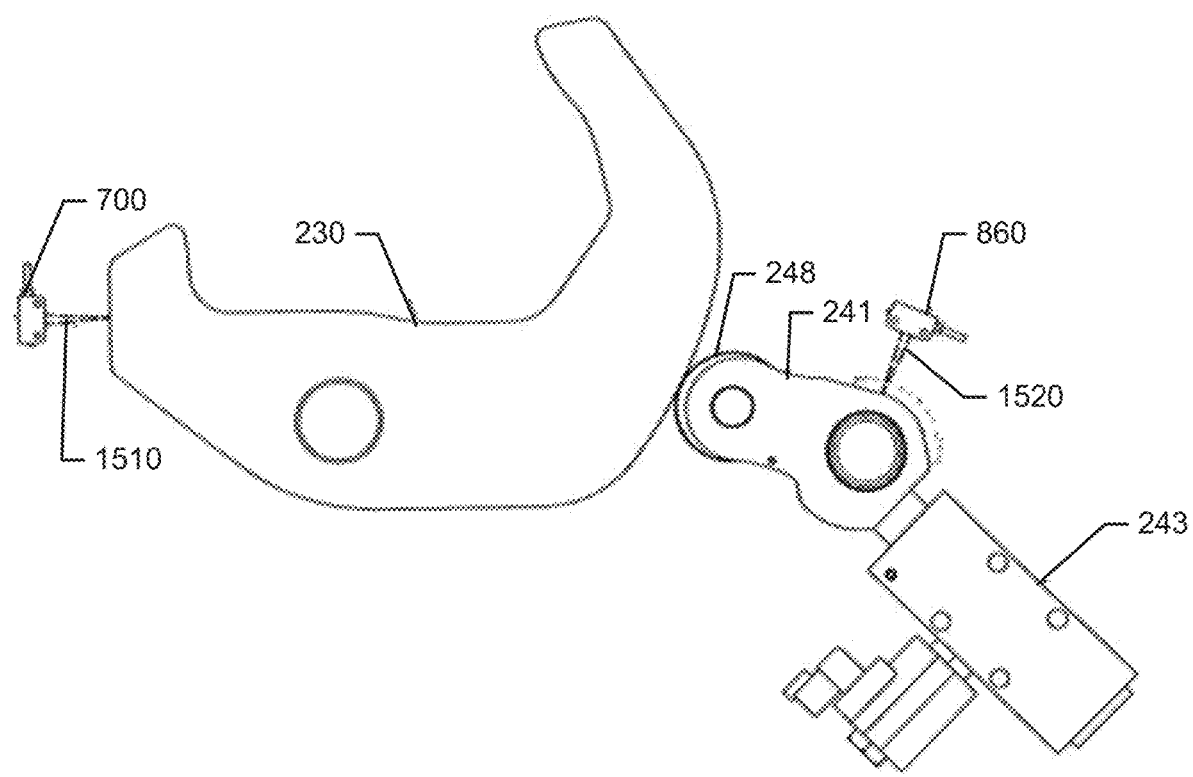
FIG. 15A illustrates a hook, cam lock and cylinder assembly with sensors in a locked position in accordance with an example embodiment.
Figure 15B:
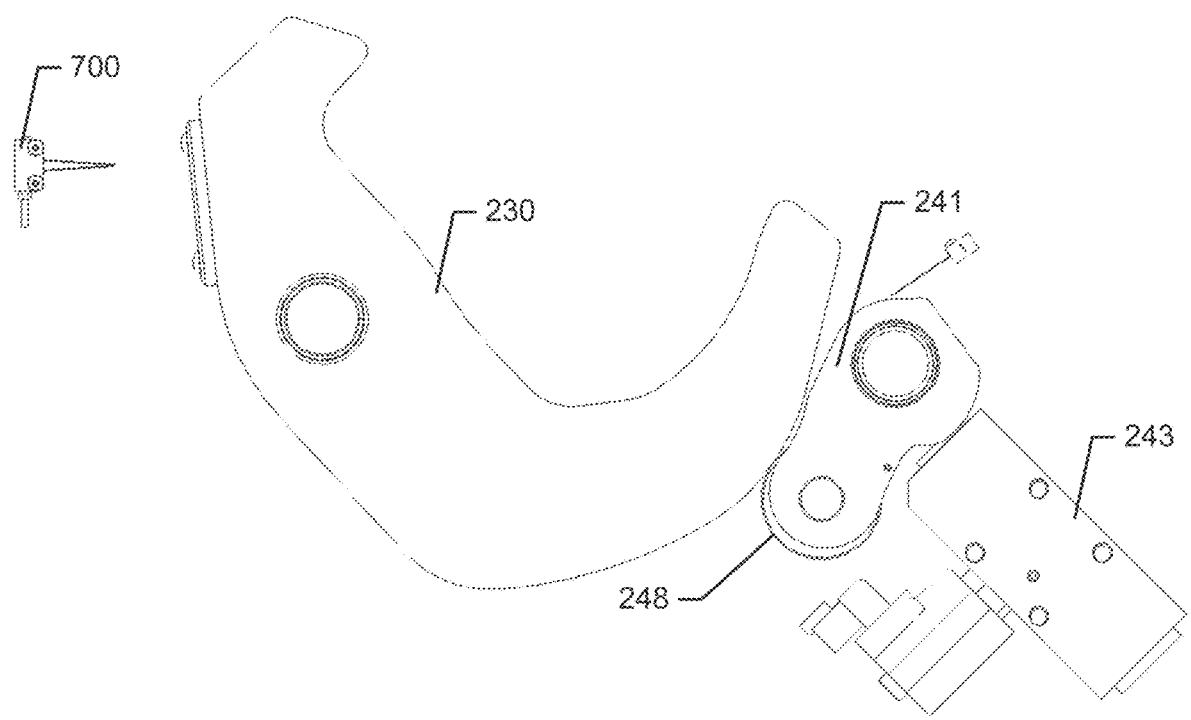
FIG. 15B illustrates the hook, cam lock and cylinder assembly of FIG. 15A in an unlocked position in accordance with an example embodiment.

FIG. 11 shows an unlocking sequence in accordance with an example embodiment. The unlocking sequence may begin with disengagement of the hook lock at operation 1100. Disengagement of the hook lock may transition various warning lights to indicate disengagement or unlocking in progress at operation 1102. The trailer may begin to pull away from the dock at operation 1104 and the RIG bar may contact the hook and begin to rotate the hook at operation 1106. Rotation of the hook turns the hook sensor off at operation 1108, and may disengage the slide lock at operation 1110. With continued forward movement of the trailer, the horizontal slide assembly may move forward (away from the dock) to the limit of travel in that direction at operation 1112. The cam link 241 may also rotate with the rotation of the hook to the disengaged position at operation 1120. When the cam link 241 rotates, the cam sensor 860 may turn off at operation 1122, and the hook may disengage the RIG bar entirely at operation 1124. Thereafter, the trailer may depart the dock and lose contact with the vehicle restraint, and the vehicle restraint may be reset (with lights indicating as much) and may be ready to receive another trailer at operation 1126.

Accordingly, some example embodiments may provide a vehicle restraint for restraining a vehicle or trailer at a loading dock. The vehicle restraint may include a vertical slide assembly, and a horizontal slide assembly. The vertical slide assembly may include a vertical biasing assembly, a vertical slide frame and a ramp assembly. The ramp assembly may slidably engage a RIG bar of the vehicle or trailer to lower the vertical slide frame from a resting height to a height of the RIG bar against a bias applied by the vertical biasing assembly. The horizontal slide assembly may include a restraining assembly and a locking assembly. The restraining assembly may be operably responsive to movement of the RIG bar, and without a motor, to transition between a receiving position for receiving or releasing the RIG bar and a locking position for retaining the RIG bar. The locking assembly may be operable to alternately lock and unlock the restraining assembly in the locking position.

The vehicle restraint and/or a system including the same, or components thereof described above may be augmented or modified by altering individual features mentioned above or adding optional features. The augmentations or modifications may be performed in any combination and in any order. For example, in some cases, the restraining assembly may include a hook having a locking arm at a first end thereof, a catch portion at a second end thereof, an axial orifice about which the hook rotates responsive to movement of the RIG bar in contact with the catch portion or the locking arm, and a cam surface disposed between the locking arm and the axial orifice. In an example embodiment, the horizontal slide assembly may further include a horizontal slide frame slidably engaged to the vertical slide frame. The locking assembly may include a slide lock operable to alternately lock the horizontal slide frame relative to the vertical slide frame and unlock the slide lock to permit movement of the horizontal slide frame relative to the vertical slide frame responsive to movement of the RIG bar toward or away from the dock. In some cases, the slide lock may be biased to lock the horizontal slide frame relative to the vertical slide frame, and the cam surface may interface with the slide lock during rotation of the hook to unlock the slide lock. In an example embodiment, the slide lock may include a locking arm biased toward engagement with one of a plurality of locking slots to lock the slide lock. In some cases, the horizontal slide frame may include a first set of rollers disposed in a first set of rails operably coupled to the vertical slide frame, and a first spring urging the horizontal slide frame away from the dock via the one or more rollers. The vertical biasing assembly may include a second set of rollers disposed in a second set of rails operably coupled to the dock, and a second spring urging the vertical slide frame toward the resting height. In an example embodiment, the first set of rollers may each be retained in a roller wiper. In some cases, the locking assembly may further include a hook lock to prevent rotation of the hook when locked, and the hook lock may be hydraulically operated based on an electronic signal. In an example embodiment, the hook lock may include a cam roller that is extended when contacting the locking arm, and that rides along the hook to be deflected when proximate to the cam surface. In some cases, the hook lock may further include a solenoid operated valve and reservoir, and a lock piston may be extended based on operation of the solenoid operated valve to prevent the cam roller from moving from the extended position to the deflected position to lock the hook. In an example embodiment, a sensor may detect when the cam roller is moved to the deflected position. In some cases, a hook channel may be formed between horizontal slide panels of the horizontal slide frame, and the hook may rotate within the hook channel so that only the catch portion is extended out of the hook channel when the restraining assembly is in the receiving position. In an example embodiment, the locking arm may extend out of the hook channel responsive to rotation of the hook, and the catch portion may be detected by a sensor disposed proximate thereto when the restraining assembly is in the locking position. In some cases, a position of the hook may be detected by a first sensor, and a condition of the locking assembly may be detected by a second sensor. In such cases, one or more lights proximate the dock may be lit based on input from the first and second sensors.

A method of restraining a RIG bar of a vehicle or trailer at a dock using a restraint device may also be provided. The method may include engaging the RIG bar by the restraint device responsive to horizontal motion of the RIG bar, actuating a locking member of the restraint device responsive to the horizontal motion of the RIG bar reaching an engagement position, retaining the RIG bar at the engagement position until the locking member is unlocked, and, responsive to unlocking the locking member, permitting horizontal motion of the RIG bar to reposition the locking member for a subsequent actuation. Such method, and indeed the assembly itself, is unique in that the motion of the RIG bar positions the locking means both to perform the locking of the RIG bar (when the RIG bar reaches the engagement position) and to reposition the locking means to be ready for the next locking operation (when the RIG bar leaves the engagement position). Industry standard in this regard has long been to use other moving means (e.g., hydraulic, electric, or mechanical motive force) to reposition the locking means. Thus, example embodiments provide a system that can even work in the event of an electrical failure, or in any case avoid any need for separate powered movement of the locking means.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle restraint for restraining a vehicle or trailer at a dock, the vehicle restraint comprising:
   a vertical slide assembly comprising a vertical biasing assembly, a vertical slide frame and a ramp assembly, the ramp assembly slidably engaging a rear impact guard (RIG) bar of the vehicle or trailer to lower the vertical slide frame from a resting height to a height of the RIG bar against a bias applied by the vertical biasing assembly; and
   a horizontal slide assembly operably coupled to the vertical slide assembly, the horizontal slide assembly comprising a horizontal slide frame slidably engaged to the vertical slide frame, the horizontal slide assembly further comprising a restraining assembly and a locking assembly,
   wherein the restraining assembly is operable responsive to movement of the RIG bar, and without a motor, to transition between a receiving position for receiving or releasing the RIG bar and a locking position for retaining the RIG bar, and
   wherein the locking assembly is operable to alternately lock and unlock the restraining assembly in the locking position.

2. The vehicle restraint of claim 1, wherein the restraining assembly comprises a hook having a locking arm at a first end thereof, a catch portion at a second end thereof, an axial orifice about which the hook rotates responsive to movement of the RIG bar in contact with the catch portion or the locking arm, and a cam surface disposed between the locking arm and the axial orifice.

3. The vehicle restraint of claim 2,
   wherein the locking assembly comprises a slide lock operable to alternately lock the horizontal slide frame relative to the vertical slide frame and unlock the slide lock to permit movement of the horizontal slide frame relative to the vertical slide frame responsive to movement of the RIG bar toward or away from the dock.

4. The vehicle restraint of claim 3, wherein the slide lock is biased to lock the horizontal slide frame relative to the vertical slide frame, and
   wherein the cam surface interfaces with the slide lock during rotation of the hook to unlock the slide lock.

5. The vehicle restraint of claim 4, wherein the slide lock comprises a locking arm biased toward engagement with one of a plurality of locking slots to lock the slide lock.

6. The vehicle restraint of claim 3, wherein the horizontal slide frame comprises a first set of rollers disposed in a first set of rails operably coupled to the vertical slide frame, and a first spring urging the horizontal slide frame away from the dock via the one or more rollers, and
   wherein the vertical biasing assembly comprises a second set of rollers disposed in a second set of rails operably coupled to the dock, and a second spring urging the vertical slide frame toward the resting height.

7. The vehicle restraint of claim 6, wherein the first set of rollers are each retained in a roller wiper to assist in cleaning the first set of rollers as they rotate and operably clean a roller path fore and aft during travel.

8. The vehicle restraint of claim 2, wherein the locking assembly further comprises a hook lock to prevent rotation of the hook when locked, and
   wherein the hook lock is hydraulically engaged based on an electronic signal.

9. The vehicle restraint of claim 8, wherein the hook lock comprises a cam link that is extended when contacting the locking arm, and that rides along the hook to be deflected when proximate to the cam surface.

10. The vehicle restraint of claim 9, wherein the hook lock further comprises a solenoid operated valve and reservoir, and
    wherein a lock piston is fixed in an extended position based on operation of the solenoid operated valve to prevent the cam roller from moving from an extended position to a deflected position to lock the hook.

11. The vehicle restraint of claim 10, wherein a sensor detects when the cam roller is moved to the deflected position.

12. The vehicle restraint of claim 8, wherein the hook lock comprises a cam link that engages and travels along cam surface of the hook and is lockable when extended to prevent the hook from rotating.

13. The vehicle restraint of claim 3, wherein a hook channel is formed between horizontal slide panels of the horizontal slide frame,
    wherein the hook rotates within the hook channel, and
    wherein only the catch portion is extended out of the hook channel when the restraining assembly is in the receiving position.

14. The vehicle restraint of claim 13, wherein the locking arm extends out of the hook channel responsive to rotation of the hook, and
    wherein the catch portion is detected by a sensor disposed proximate thereto when the restraining assembly is in the locking position.

15. The vehicle restraint of claim 2, wherein a position of the hook is detected by a first sensor, and a condition of the locking assembly is detected by a second sensor, and
    wherein one or more lights proximate the dock are lit based on input from the first and second sensors.

16. A vehicle restraint system for restraining a vehicle or trailer at a dock, the vehicle restraint system comprising:
    a set of vertically mounted rails fixed to the dock;
    one or more bumpers mounted proximate to the rails; and a vehicle restraint operably coupled to the rails, the vehicle restraint comprising:
  a vertical slide assembly comprising a vertical biasing assembly, a vertical slide frame and a ramp assembly, the ramp assembly slidably engaging a rear impact guard (RIG) bar of the vehicle or trailer to lower the vertical slide frame from a resting height to a height of the RIG bar against a bias applied by the vertical biasing assembly,
  a restraining assembly operable responsive only to movement of the RIG bar to transition between a receiving position for receiving or releasing the RIG bar and a locking position for retaining the RIG bar,
  a locking assembly operably coupled to the restraining assembly to alternately lock and unlock the restraining assembly in the locking position, and
  a horizontal slide assembly operably coupled to the vertical slide assembly, the horizontal slide assembly comprising a horizontal slide frame slidably engaged to the vertical slide frame.

17. The vehicle restraint system of claim 16, wherein the restraining assembly comprises a hook having a locking arm at a first end thereof, a catch portion at a second end thereof, an axial orifice about which the hook rotates responsive to movement of the RIG bar in contact with the catch portion or the locking arm, and a cam surface disposed between the locking arm and the axial orifice.

18. The vehicle restraint system of claim 17,
  wherein the locking assembly comprises a slide lock operable to alternately lock the horizontal slide frame relative to the vertical slide frame and unlock the slide lock to permit movement of the horizontal slide frame relative to the vertical slide frame responsive to movement of the RIG bar toward or away from the dock.

19. The vehicle restraint system of claim 18, wherein the slide lock is biased to lock the horizontal slide frame relative to the vertical slide frame, and
  wherein the cam surface interfaces with the slide lock during rotation of the hook to unlock the slide lock.

20. The vehicle restraint system of claim 19, wherein the slide lock comprises a locking arm biased toward engagement with one of a plurality of locking slots to lock the slide lock.

21. A restraining assembly for a vehicle restraint for restraining a rear impact guard (RIG) bar of a vehicle or trailer at a dock, the restraining assembly comprising a hook including:
  a locking arm at a first end thereof;
  a catch portion at a second end thereof;
  an axial orifice about which the hook rotates responsive to movement of the RIG bar in contact with the catch portion or the locking arm; and
  a cam surface disposed between the locking arm and the axial orifice,
  wherein the hook is rotatably mounted to a vertical slide assembly of the vehicle restraint that slidably engages the RIG bar to adjust to a height of the RIG bar against a bias applied to the vertical slide assembly,
  wherein the hook is rotated only responsive to movement of the RIG bar to transition between a receiving position for receiving or releasing the RIG bar and a locking position for retaining the RIG bar, and
  wherein the hook rotates within a hook channel defined in part by a horizontal slide frame panel that extends over a top portion of the RIG bar when the hook retains the RIG bar in the hook channel.

22. A method of restraining a rear impact guard (RIG) bar of a vehicle or trailer at a dock using a restraint device, the method comprising:
  engaging the RIG bar by a horizontal slide assembly of the restraint device responsive to horizontal motion of the RIG bar, the horizontal motion of the RIG bar further causing a vertical displacement of a vertical slide frame of the restraint device via a vertical slide assembly that is operably coupled to the horizontal slide assembly, the horizontal slide assembly comprising a horizontal slide frame slidably engaged to the vertical slide frame;
  actuating a locking member of the restraint device responsive to the horizontal motion of the RIG bar reaching an engagement position;
  retaining the RIG bar at the engagement position until the locking member is unlocked; and
  responsive to unlocking the locking member, permitting horizontal motion of the RIG bar to reposition the locking member for a subsequent actuation.

* * * * *